(12) United States Patent
Kingston et al.

(10) Patent No.: US 11,406,208 B2
(45) Date of Patent: Aug. 9, 2022

(54) CONTAINER

(71) Applicant: Jade Louise Kingston, Bedford (AU)

(72) Inventors: Jade Louise Kingston, Bedford (AU);
Edward Joseph Khoury, Bateman (AU)

(73) Assignee: Jade Louise Kingston, Bedford (AU)

( * ) Notice: Subject to any disclaimer, the term of this patent is extended or adjusted under 35 U.S.C. 154(b) by 255 days.

(21) Appl. No.: 16/627,114

(22) PCT Filed: Jun. 28, 2018

(86) PCT No.: PCT/AU2018/050659
§ 371 (c)(1),
(2) Date: Dec. 27, 2019

(87) PCT Pub. No.: WO2019/000038
PCT Pub. Date: Jan. 3, 2019

(65) Prior Publication Data
US 2020/0178715 A1 Jun. 11, 2020

(30) Foreign Application Priority Data

Jun. 29, 2017 (AU) .................................. 2017902527

(51) Int. Cl.
*A47G 21/00* (2006.01)
*A47J 47/14* (2006.01)
(52) U.S. Cl.
CPC ............ *A47G 21/001* (2013.01); *A47J 47/14* (2013.01)

(58) Field of Classification Search
CPC ................ B65D 85/72; B65D 81/3453; B65D 2401/15; B65D 17/4011; B65D 2401/10; B65D 2543/00268; B65D 85/34; B65D 9/18; B65D 1/0215; B65D 2575/586; B32B 2439/70; B32B 27/00; A47G 21/001; A47J 47/14
See application file for complete search history.

(56) References Cited

U.S. PATENT DOCUMENTS

| 4,478,265 A | 10/1984 | Demarco |
| 5,163,608 A | 11/1992 | Block |

(Continued)

FOREIGN PATENT DOCUMENTS

| DE | 29809770 U1 | 2/1999 |
| EP | 3085255 A1 | 10/2016 |

(Continued)

OTHER PUBLICATIONS

Australian Search Report from AU Application No. 2017902527, dated Jun. 15, 2018.

(Continued)

*Primary Examiner* — Shawn M Braden
(74) *Attorney, Agent, or Firm* — Workman Nydegger

(57) ABSTRACT

A container comprising an outer shell formed from a plurality of elongate wall members. Lip portions extend outwardly from along longitudinal sides of each of the wall members such that inner surfaces of the lip portions face each other. Inner surfaces of the lip portions include a press seal mechanism such that pressing inwardly on outer surfaces of adjacent lip portions engages the press seal mechanism to form a plurality of seams securing adjacent wall members together.

19 Claims, 24 Drawing Sheets

(56) References Cited

U.S. PATENT DOCUMENTS

| | | | |
|---|---|---|---|
| 2006/0096978 A1* | 5/2006 | Lafferty | B65D 81/3858 |
| | | | 219/730 |
| 2006/0172096 A1* | 8/2006 | Kyle | B32B 27/32 |
| | | | 428/35.2 |
| 2007/0261771 A1 | 11/2007 | Fitzgerald | |
| 2008/0063758 A1* | 3/2008 | Kwiat | A21D 15/02 |
| | | | 426/120 |
| 2008/0311321 A1* | 12/2008 | Sparholt | B32B 27/40 |
| | | | 428/35.2 |
| 2013/0216991 A1 | 8/2013 | Sinnamond | |
| 2017/0015459 A1* | 1/2017 | Warner | B65D 55/06 |
| 2021/0047098 A1* | 2/2021 | Isserles | B65D 85/36 |

FOREIGN PATENT DOCUMENTS

| | | |
|---|---|---|
| JP | S503666 Y1 | 1/1975 |
| NL | 1024277 C2 | 3/2005 |
| WO | 2008045731 A2 | 4/2008 |
| WO | 2011069210 A1 | 6/2011 |

OTHER PUBLICATIONS

International Search Report and Written Opinion from PCT Application No. PCT/AU2018/050659, dated Aug. 27, 2018.

\* cited by examiner

DETAIL A

CONTAINER

FIELD OF THE INVENTION

The present invention relates to a container for holding food items, such as wraps.

BACKGROUND TO THE INVENTION

Various containers are available for transporting food items such as sandwiches. Such containers however are often not suitable for holding wraps formed from ingredients rolled within a flatbread. It is more common to roll the wrap within a paper or plastic sheet, which must then be removed from the wrap when it is to be eaten. In order to contain the contents of the wrap while eating, it is common to unroll the covering from the wrap in stages as the wrap is consumed.

The present invention relates to a container for holding food items such as wraps. The container is provided to be of a suitable shape for securely holding the wrap and from which the wrap can be consumed.

SUMMARY OF THE INVENTION

According to one aspect of the present invention there is provided a container comprising:

an outer shell having a first end and an opposed second end, the outer shell formed from a plurality of elongate wall members each having first and second longitudinal sides extending from the first end towards the second end; and lip portions extending transversely outwardly from along the first and second longitudinal sides of each of the wall members such that inner surfaces of the lip portions on the first and second longitudinal sides of each wall member are locatable adjacent inner surfaces of the lip portions on the second and first longitudinal sides respectively of adjacent wall members;

wherein the inner surfaces of the lip portions include a press seal mechanism such that pressing inwardly on outer surfaces of adjacent lip portions engages the press seal mechanism to form a plurality of seams securing adjacent wall members together.

Preferably the press seal mechanism comprises a rib provided on an inner surface of the first lip portion and a channel provided on an inner surface of the second lip portion.

Preferably the channel includes a narrowed neck portion and the rib includes a complementary widened outer end.

Preferably the widened outer end of the rib is dome shaped such that the rib and the channel are mushroom shaped.

Preferably the outer shell comprises a domed first end portion, a domed second end portion and a cylindrical side portion.

In a preferred embodiment, each of the wall members comprises an elongate wall having an arcuate transverse cross section and inwardly tapering opposed ends such that the connected wall members form the tubular outer shell having domed end portions.

Preferably the wall members are formed from a flexible material.

In a preferred embodiment, the wall members are formed from a silicone based material.

Preferably the wall members are each of the same size such that the seams are located at equal angular spacings around the periphery of the outer shell.

In a preferred embodiment, the seams extend from the first end portion to the second end portion of the outer shell such that the wall members may be completely separated.

Preferably upper and lower ends of the wall members include arcuate recesses such that, when the wall members are connected together, circular upper and lower openings are defined.

Preferably upper and lower caps are provided to engage across the upper and lower openings respectively.

Preferably the upper and lower ends of the wall members each include a rim segment extending outwardly from the outer surface of the wall member around the arcuate recesses such that rim segments meet when the wall members connected together to form an annular rim around each of the upper and lower openings.

Preferably inner surfaces of each of the annular rims of the container are provided with a groove therein to receive a peripheral ridge provided around the upper and lower caps.

Preferably the grooves include an outer narrowed neck and the peripheral ridge includes a complementary shaped widened outer end such that the peripheral ridges can be received into the corresponding grooves by press fit.

Preferably the annular rim adjacent the first end of the container is provided with one or more tabs extending inwardly across the upper opening such that the tabs may be gripped to pull the wall members outwardly and separate the wall member from the upper cap and adjacent wall members.

In a further embodiment, the wall members are connected together at second ends thereof by a shell end portion comprising a continuous cup with each of the wall members extending outwardly from a rim portion of the cup such that the seams extend from the first end portion to a location offset from the second end portion.

Preferably one of the wall members is provided with a cover comprising a planar portion shaped to seal across the upper opening in the first end of the outer shell.

Preferably a recess is provided in the wall member opposite the wall member having the cover to allow the distal end of the cover to be gripped and flexed outwardly away from the opening.

BRIEF DESCRIPTION OF THE DRAWINGS

The invention will now be described, by way of example, with reference to the following drawings, in which:

FIG. 23b is a close up view of Detail B of FIG. 23a;

FIG. 24b is a close up view of Detail A of FIG. 24a.

DETAILED DESCRIPTION OF PREFERRED EMBODIMENTS

Figure 1:
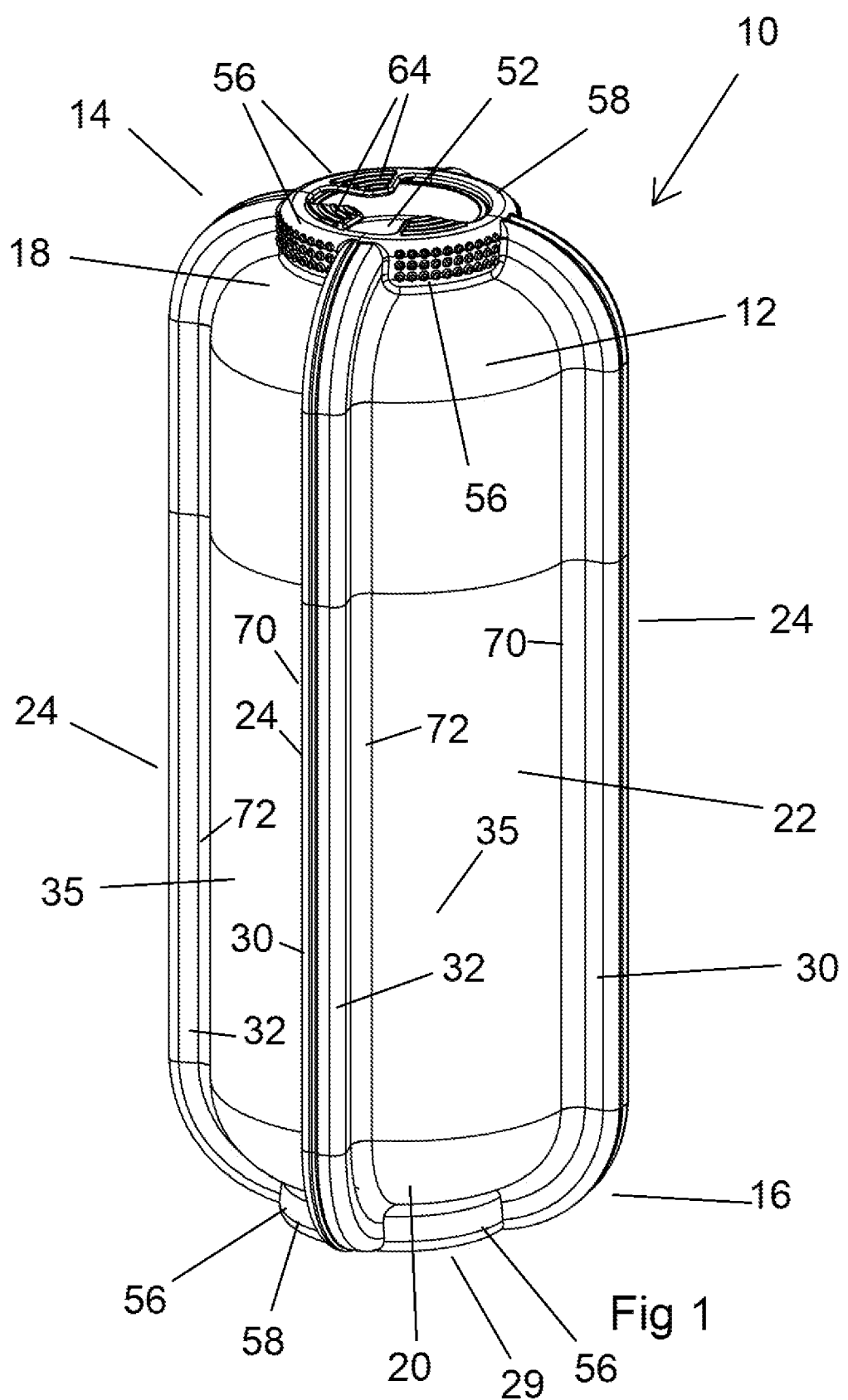
FIG. 1 is an upper perspective view of a container in accordance with the present invention.
Figure 2:
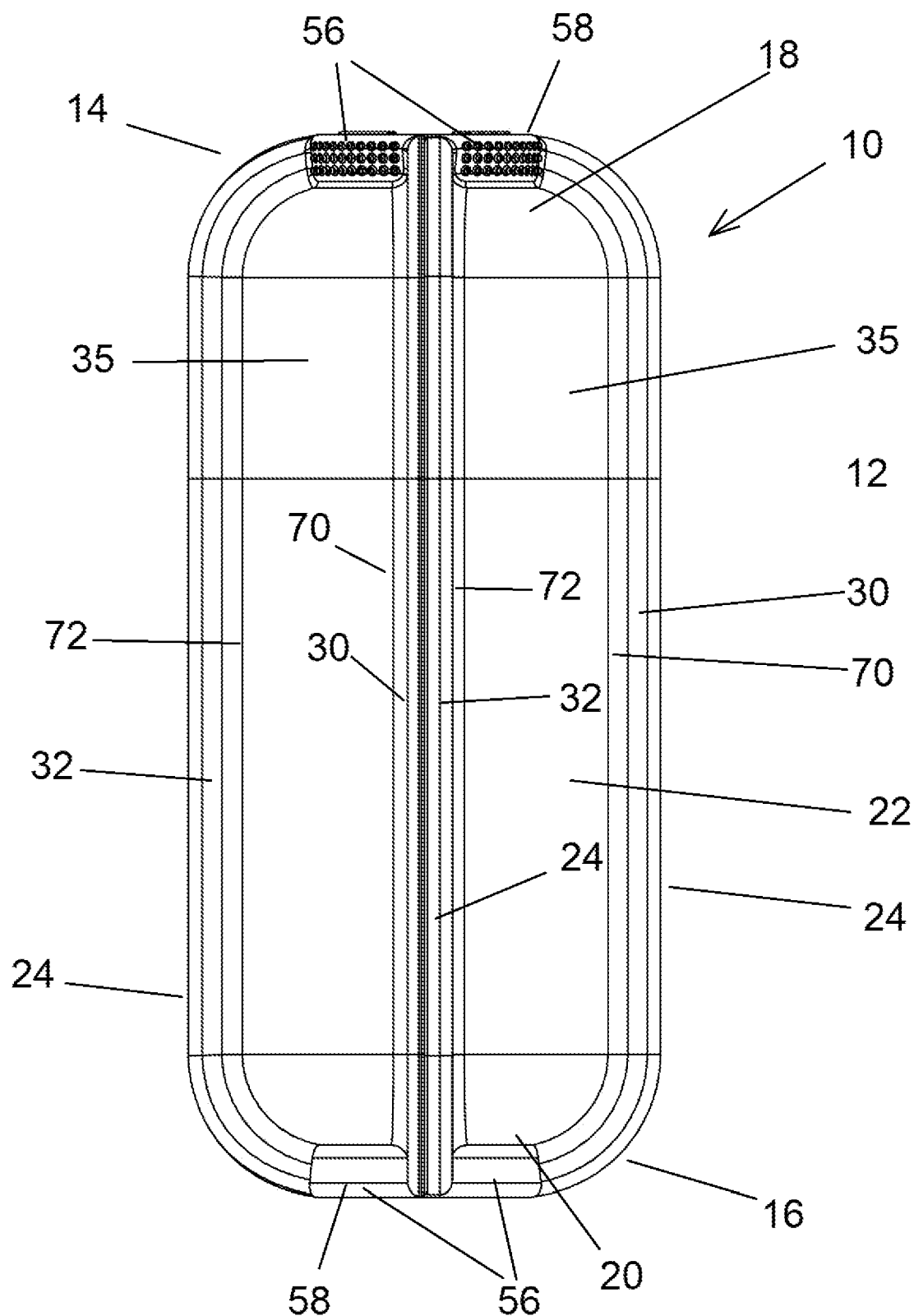
FIG. 2 is a side view of the container of FIG. 1.
Figure 3:
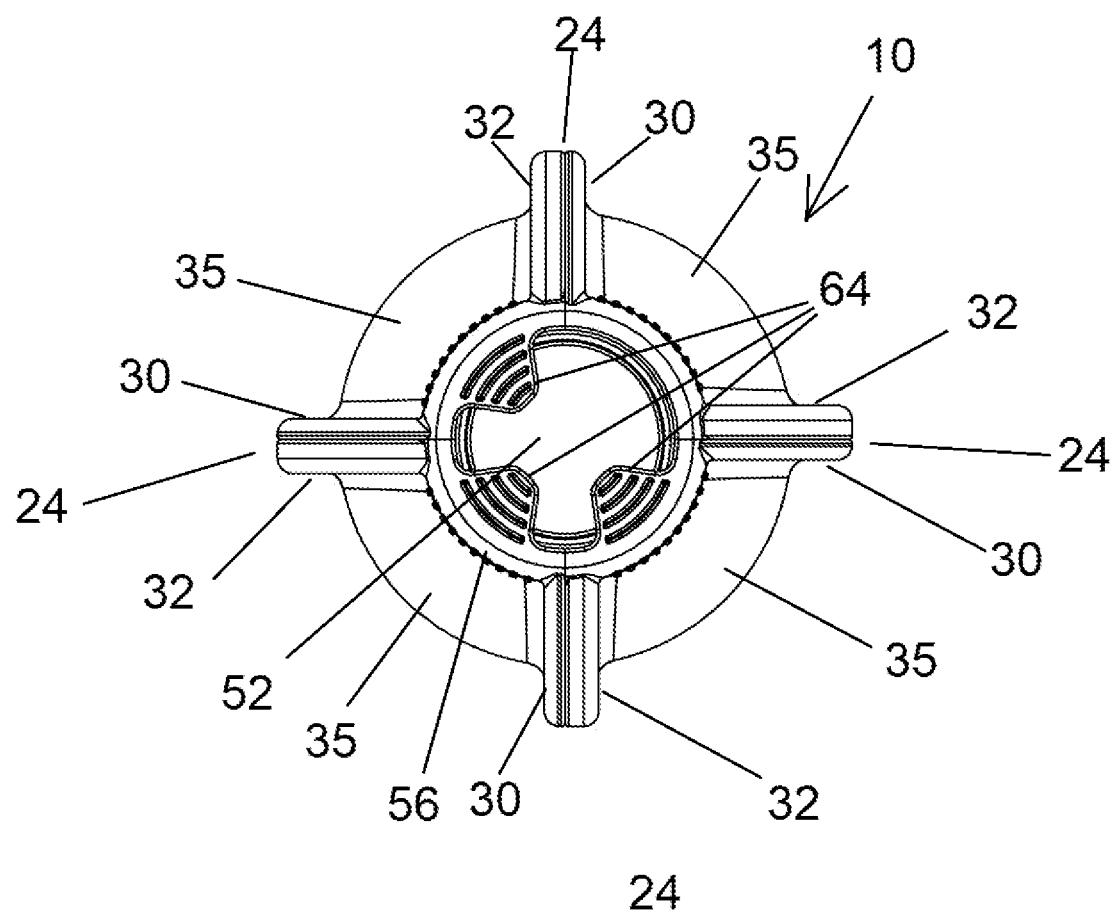
FIG. 3 is a top view of the container of FIG. 1.
Figure 4:
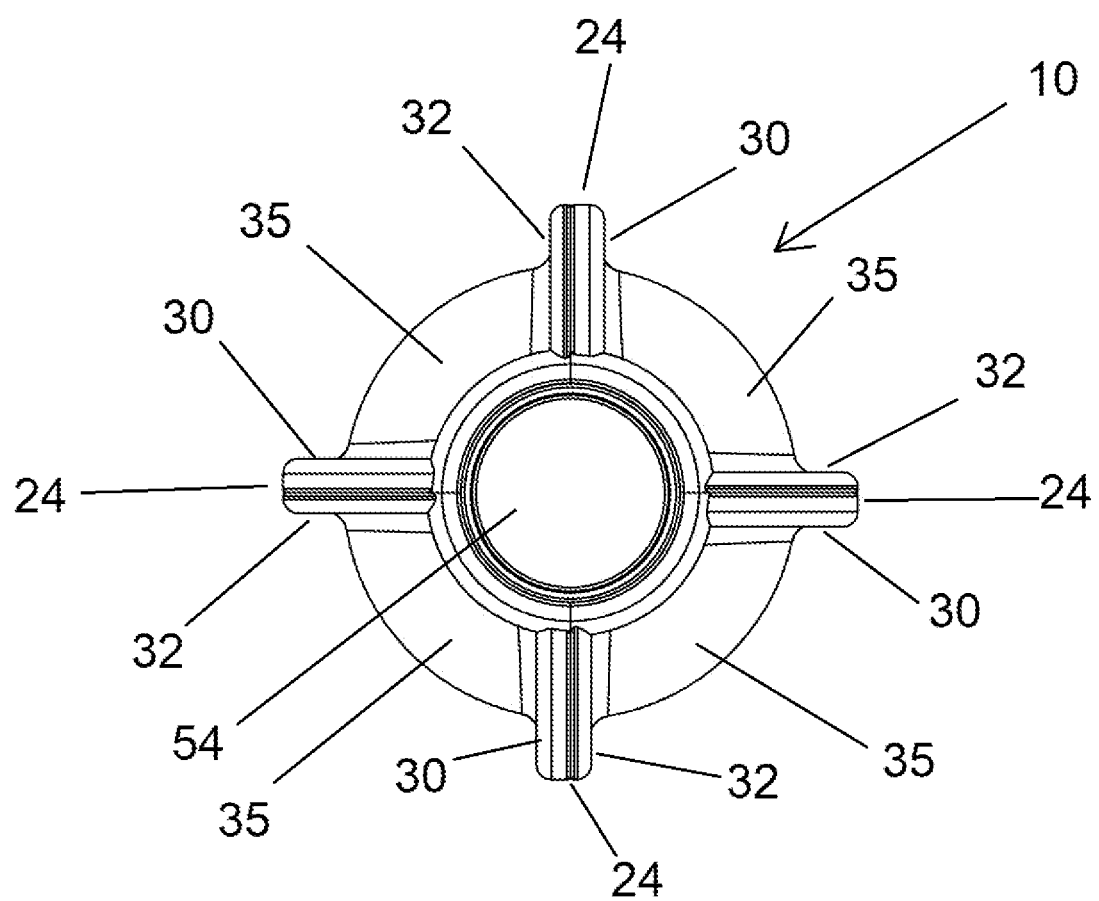
FIG. 4 is a bottom view of the container of FIG. 1.

Referring to the Figures, there is shown a container 10 comprising an outer shell 12 having a first end 14 and a second end 16. In the embodiment shown, the container 10 is generally cylindrical such that the outer shell 12 comprises generally a first end portion 18, a second end portion 20 and a cylindrical side portion 22. In the embodiment shown, the first and second end portions 18 and 20 are dome-shaped such that the outer shell 12 comprises a tubular wall of circular cross section having first and second domed end portions 18 and 20.

Figure 5:
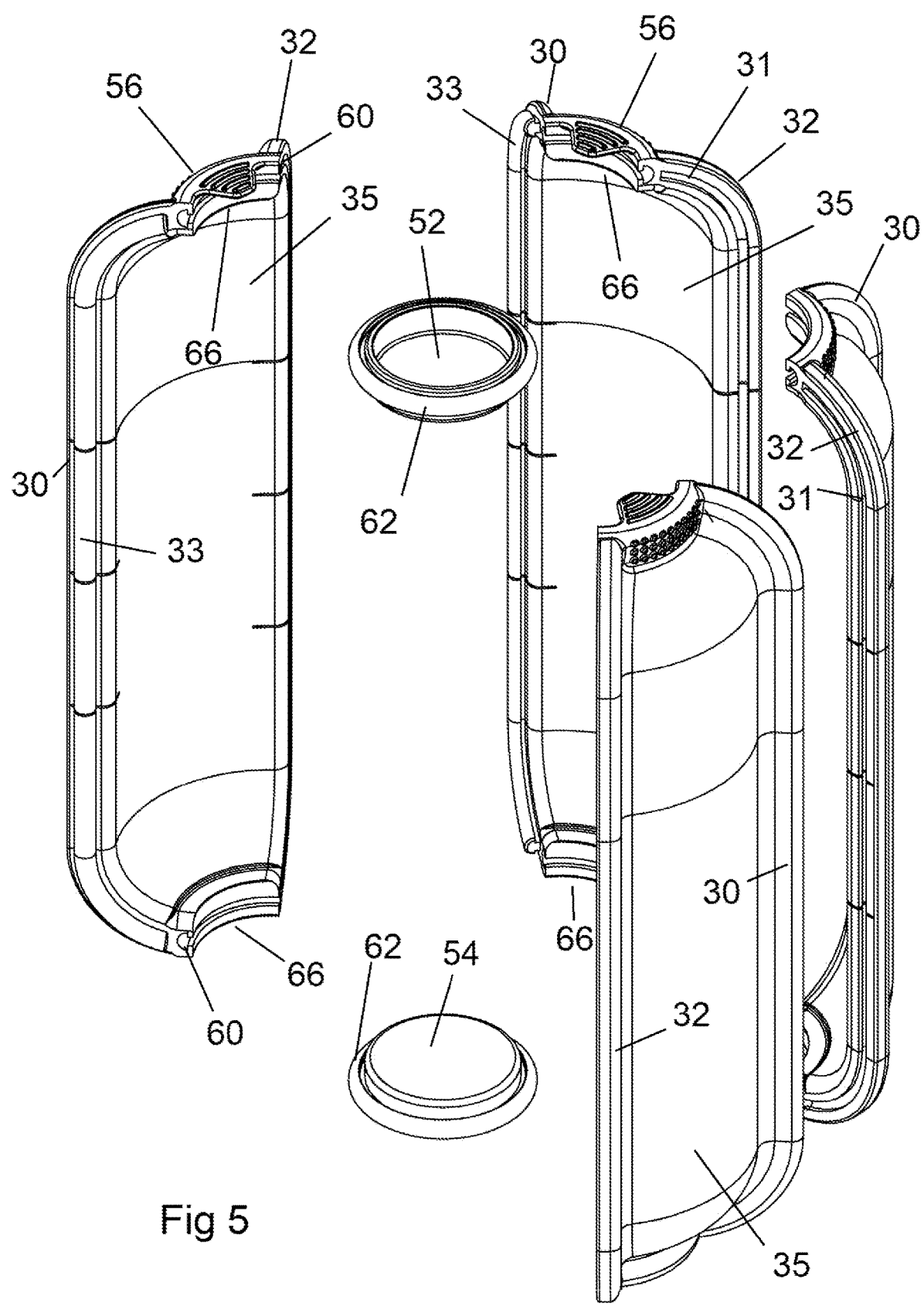
FIG. 5 is an exploded view of the container of FIG. 1.
Figure 6:
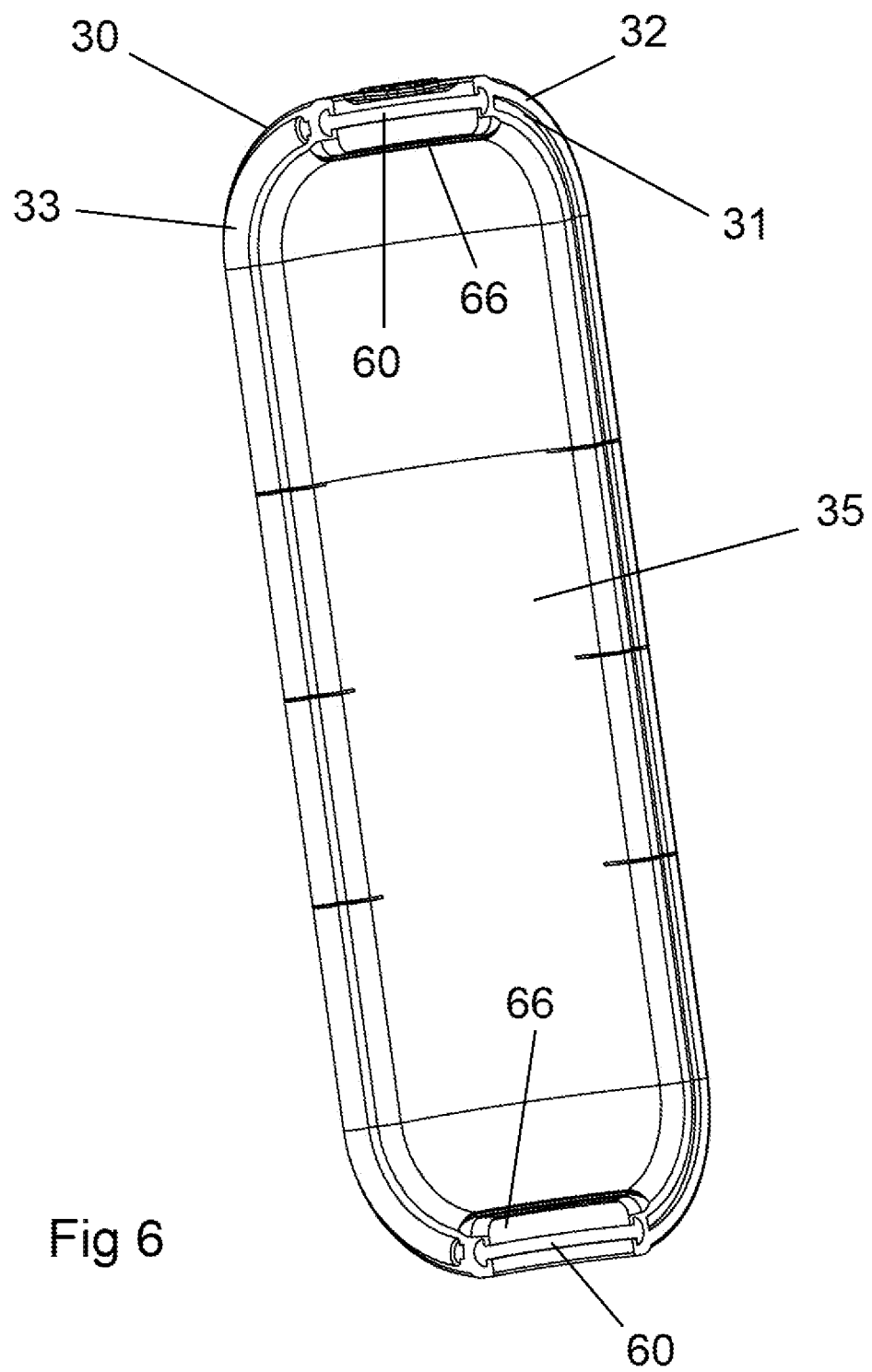
FIG. 6 is a view of one of the wall members of the container of FIG. 1.
Figure 7:
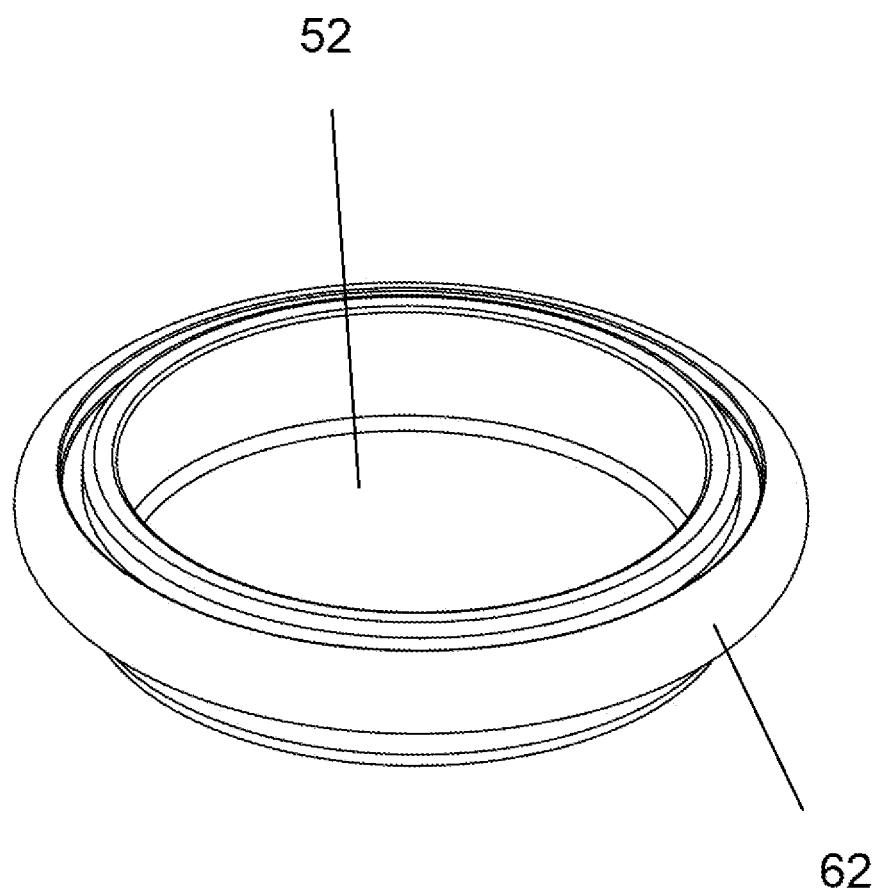
FIG. 7 is a view of the upper cap of the container of FIG. 1.
Figure 8:
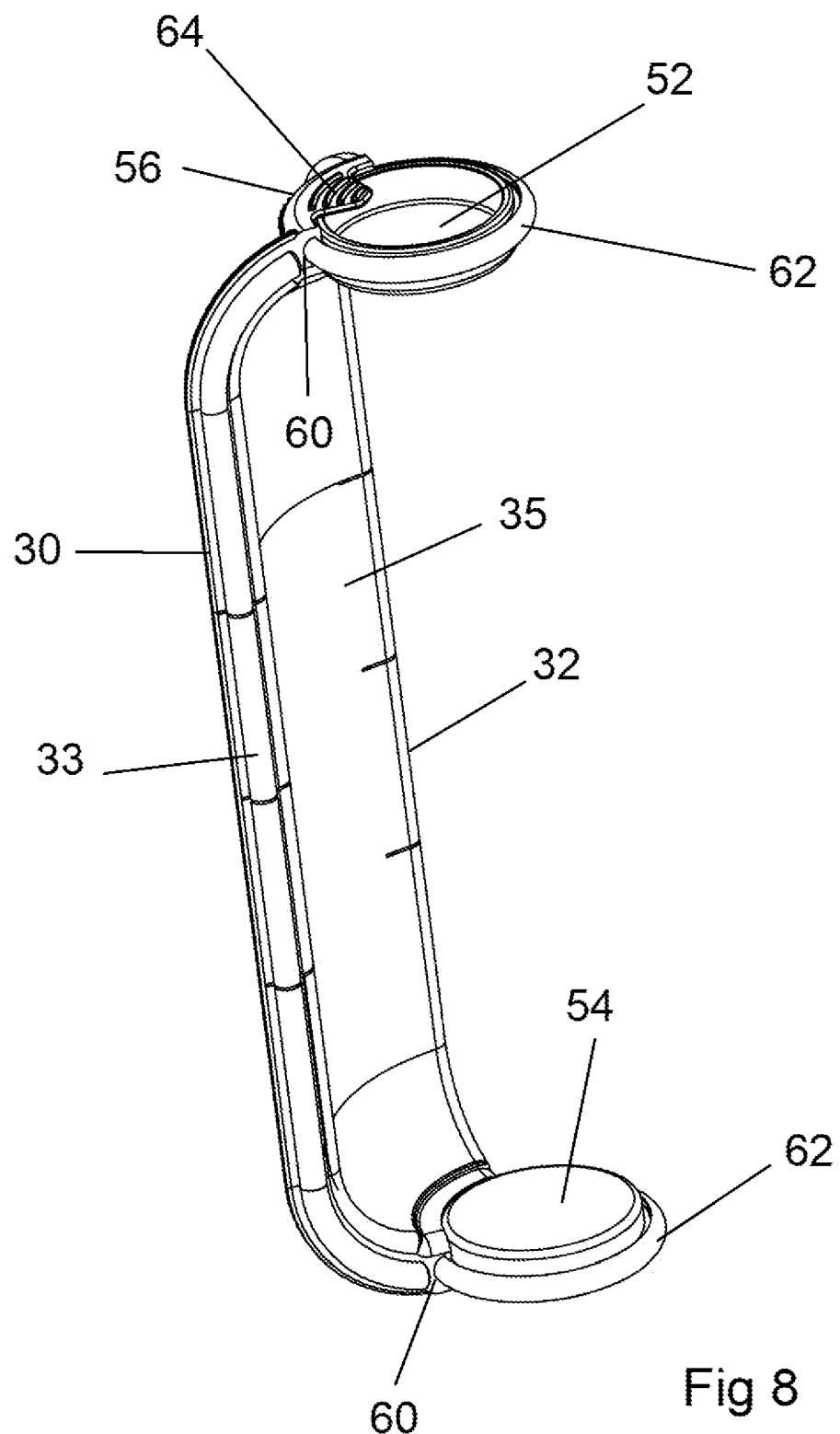
FIG. 8 is a view of one of the wall members of the container of FIG. 1 with upper and lower caps.
Figure 9:
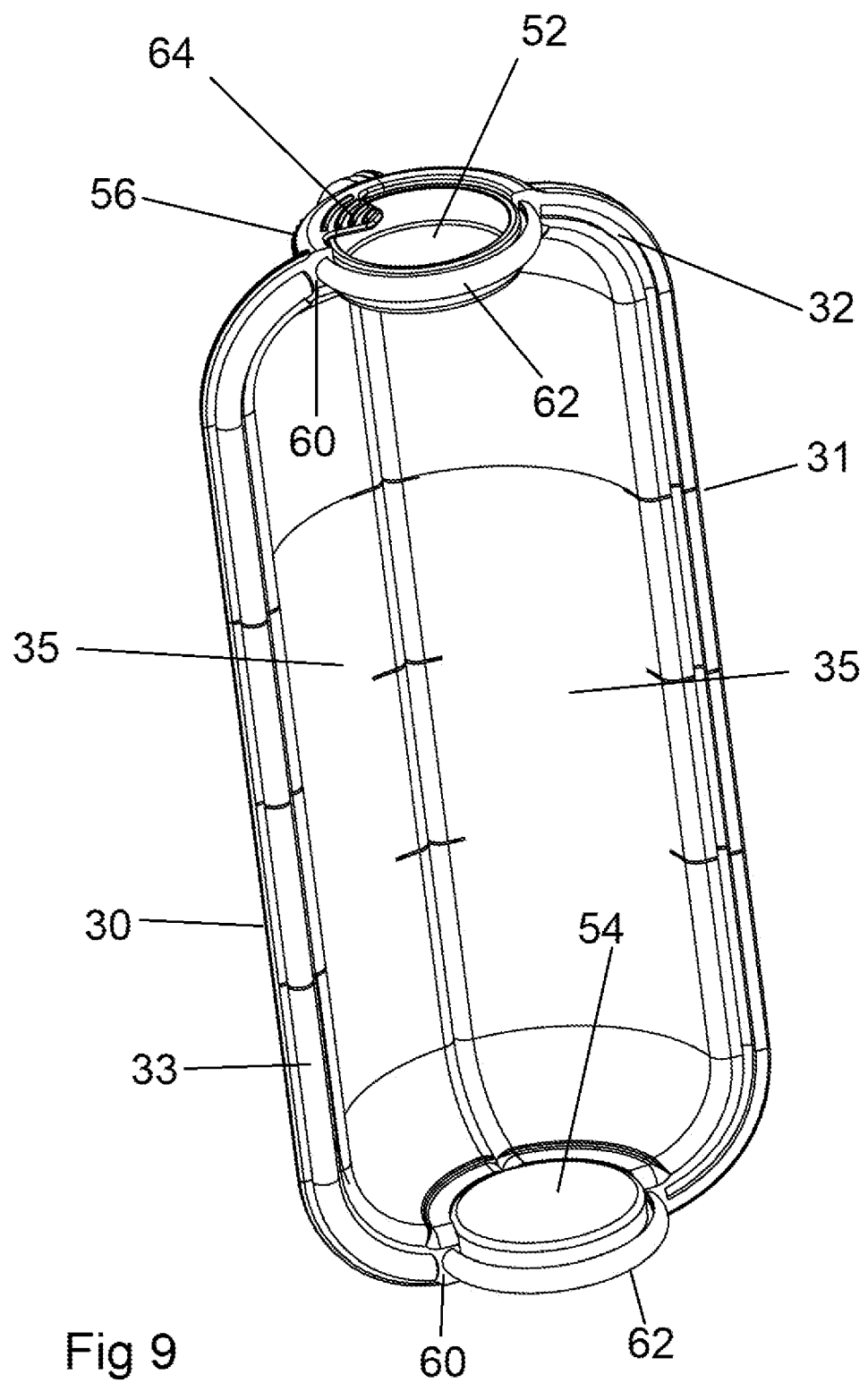
FIG. 9 is a view of two of the connected wall members with upper and lower caps.
Figure 10:
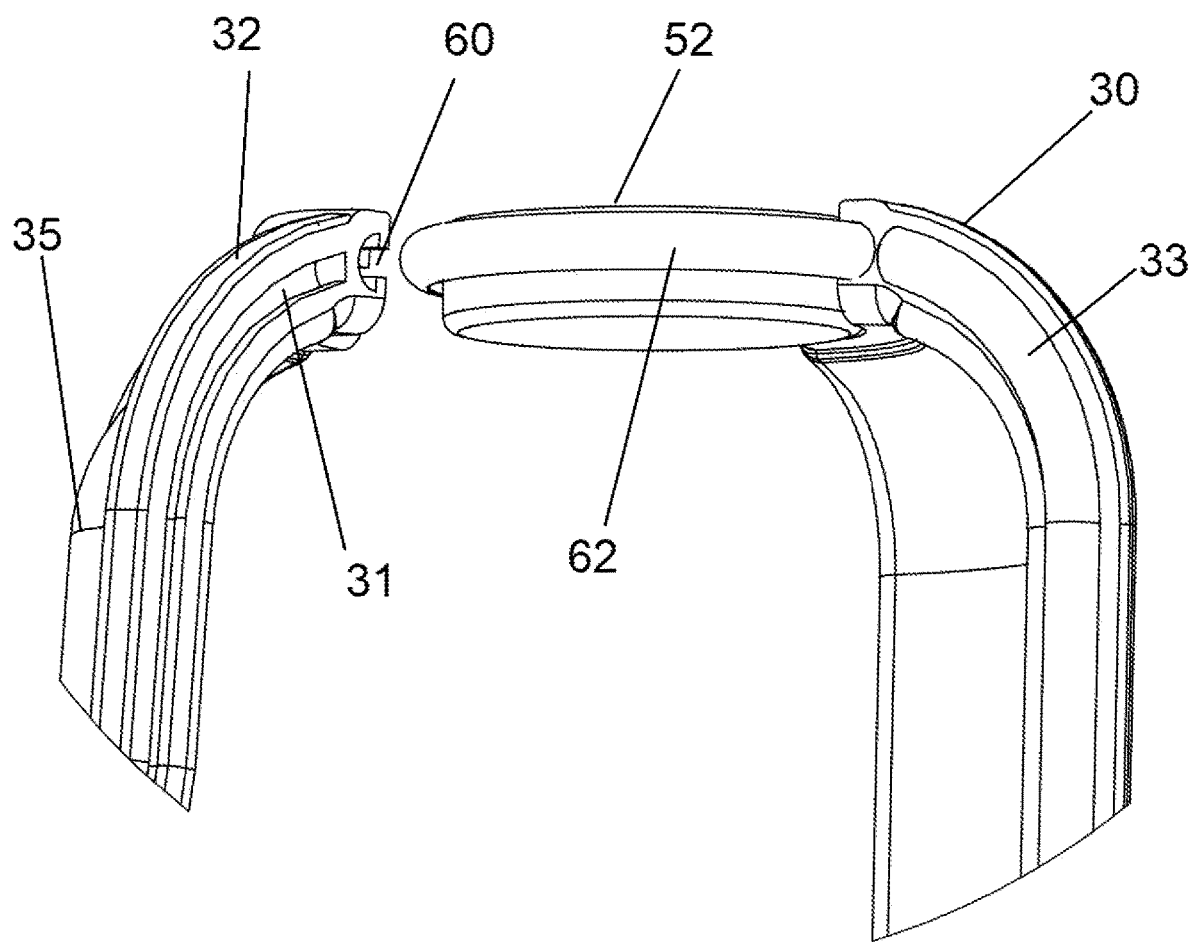
FIG. 10 is a close-up view of upper ends of the wall members connecting with the upper cap.
Figure 11:
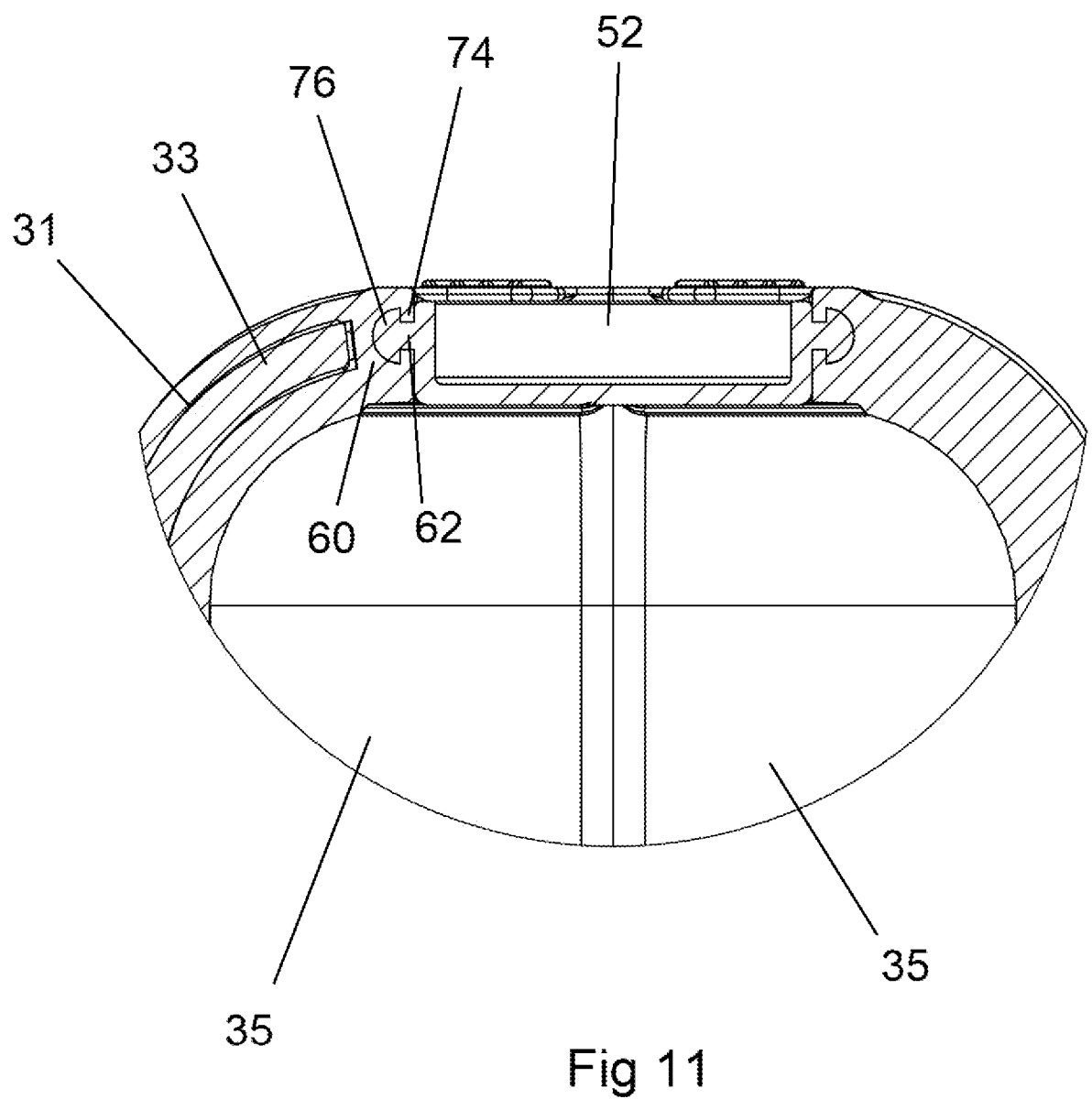
FIG. 11 is a cross sectional view of an upper end of the container of FIG. 1.

The outer shell 12 is formed by a plurality of wall members 35. Each of the wall members 35 comprises an elongate wall having first and second opposed longitudinal sides 70 and 72. The first longitudinal side 70 of each wall member 35 is releasably connectable to the second longitudinal side 72 of an adjacent wall member 35 such that the connected wall members 35 form the outer shell 12. The first and second longitudinal sides 70 and 72 of adjacent wall members 35 connect together to form seams 24 in the outer shell 12 where the seams 24 extend longitudinally through the first end portion 18 and the cylindrical side portion 22 towards the second end portion 20. In the embodiment shown in FIGS. 1 to 16, the seams 24 extend through into the second end portion 20 such that the wall members 35 may be completely separated (as shown in FIG. 5).

In the embodiment shown in FIGS. 1 to 16, the outer shell 12 is provided with four such seams 24 located at equal angular spacings around the periphery of the outer shell 12.

Each of the wall members 35 comprises an elongate wall having an arcuate transverse cross section. The wall members 35 include inwardly tapering opposed ends such that the connected wall members 35 form the tubular outer shell 12 having domed end portions 18 and 20.

The wall members 35 forming the outer shell 12 of the container 10 are formed from a flexible material, such as a suitable plastic or silicon based material.

The upper ends of the wall members 35 include arcuate recesses 66 such that, when the wall members 35 are connected together, a circular upper opening 28 is defined in the first end portion 18. The lower ends of the wall members 35 also include arcuate recesses 66 such that a lower opening 29 is defined in the second end portion 20.

Each of the wall members 36 includes a first lip portion 30 located extending along the first longitudinal side 70 of the wall member 35 and a second lip portion 32 located along the second longitudinal side 72 of the wall member 35. Each of the first and second lip portions 30 and 32 extend transversely outwardly from an outer surface of the wall member 35 such that an inner surface of the first lip portion 30 of each wall member 35 is located adjacent an inner surface of the second lip portion 32 of the adjacent wall member 35.

Each of the seams 24 is provided with a press seal mechanism located on the inner surfaces of the first and second lip portions 30 and 32 of the adjacent wall members 35. The press seal mechanism allows the adjacent wall members 35 to be separated by pulling apart and connected together by pressing together the lip portions 30 and 32 and applying sliding pressure along the seams 24.

Figure 12:
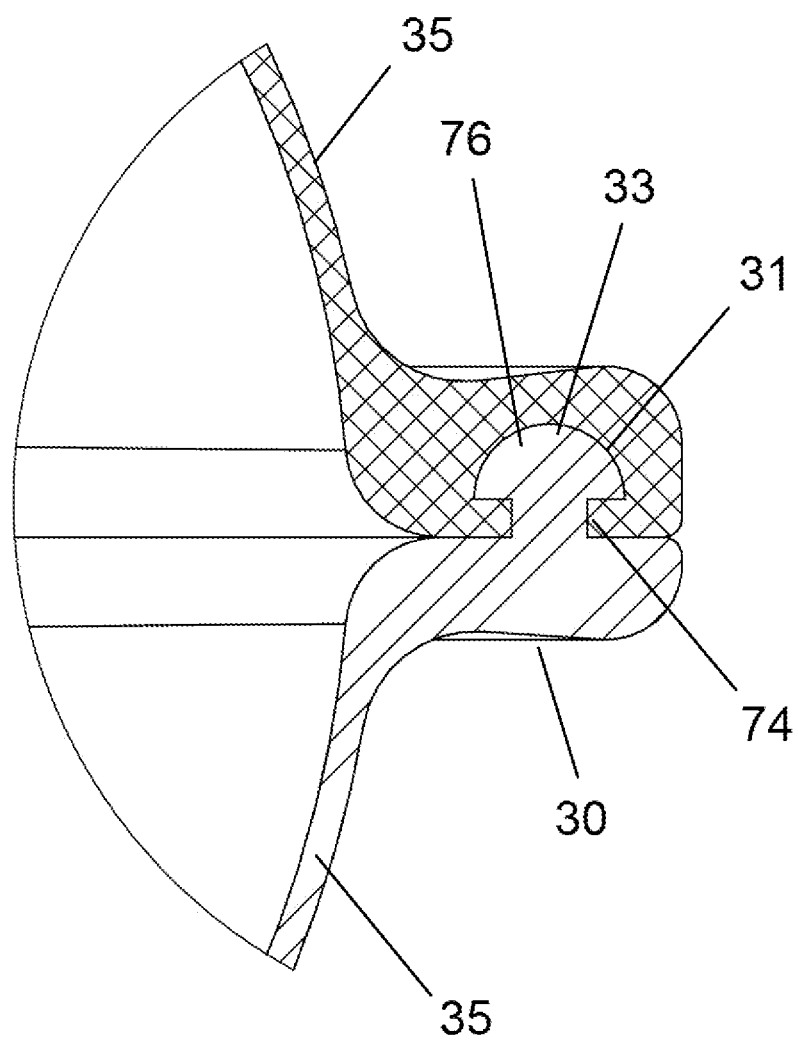
FIG. 12 is a cross sectional view showing connection between adjacent wall members.
Figure 13:
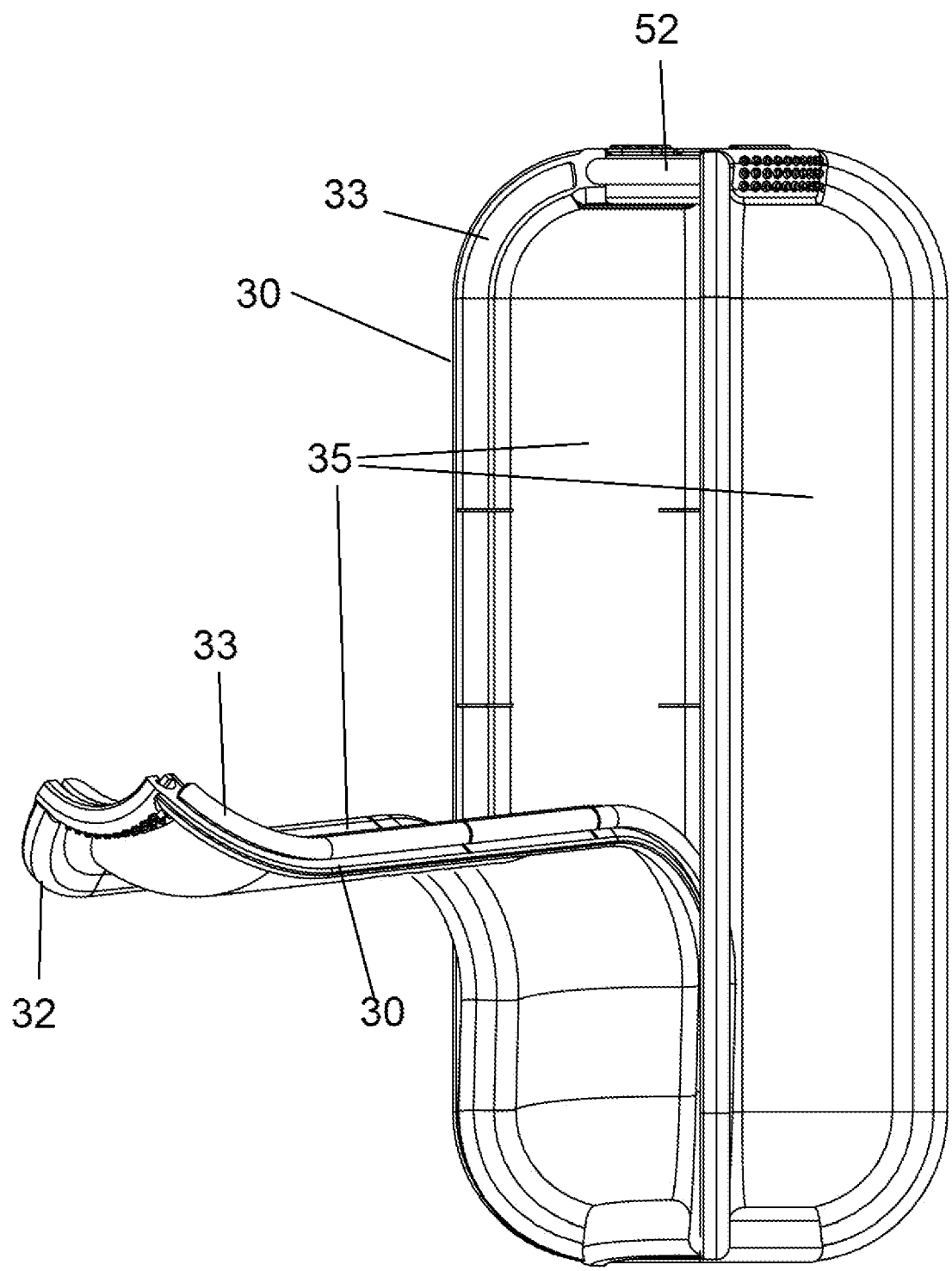
FIG. 13 is an upper perspective view of the container of FIG. 1 showing one of the wall members opened.
Figure 14:
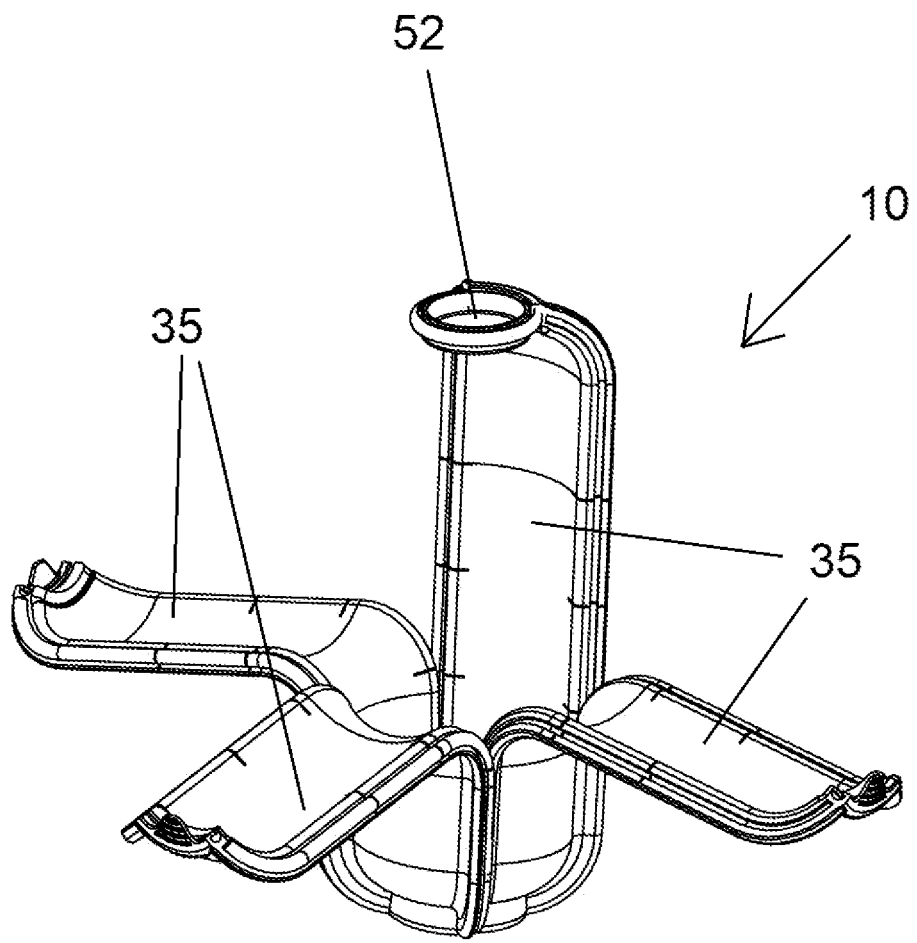
FIG. 14 is an upper perspective view of the container of FIG. 1 with three wall members opened.
Figure 15:
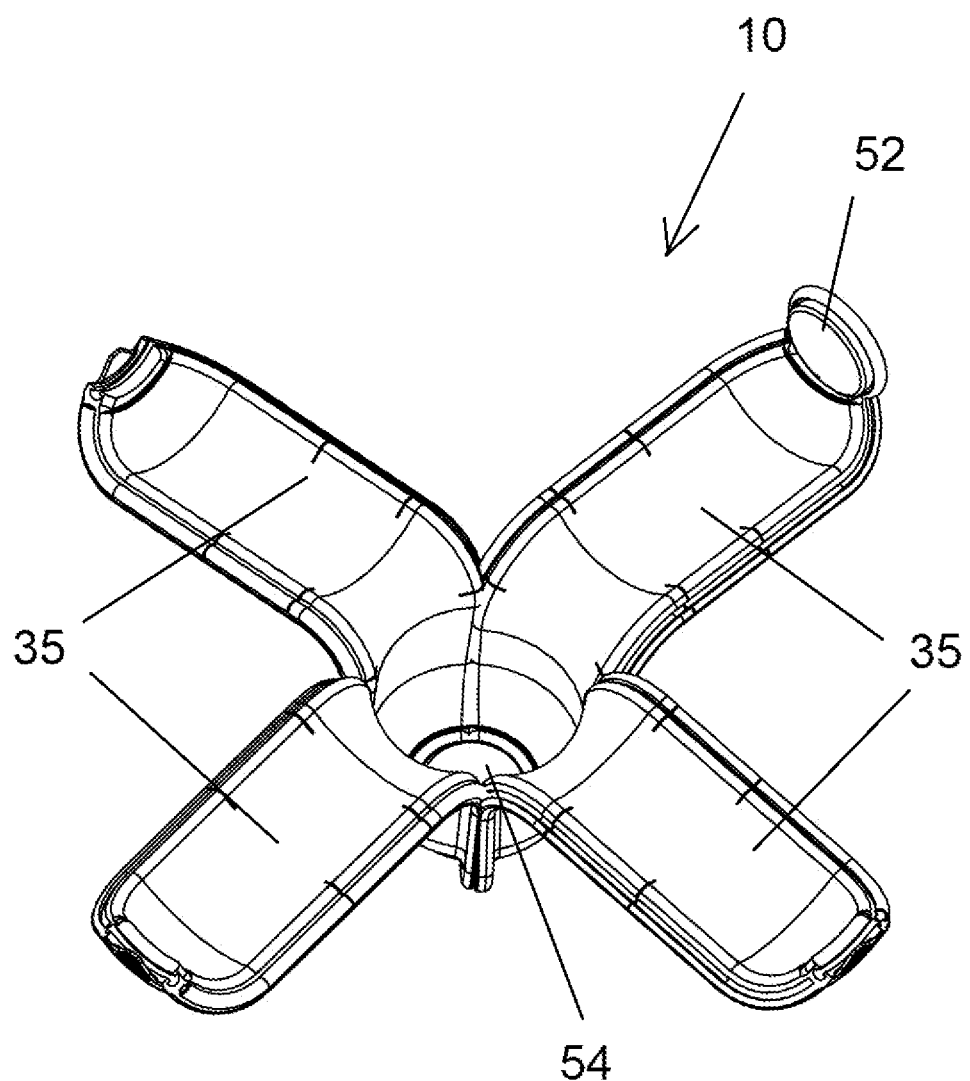
FIG. 15 is an upper perspective view of the container of FIG. 1 with all four wall members opened.
Figure 16:
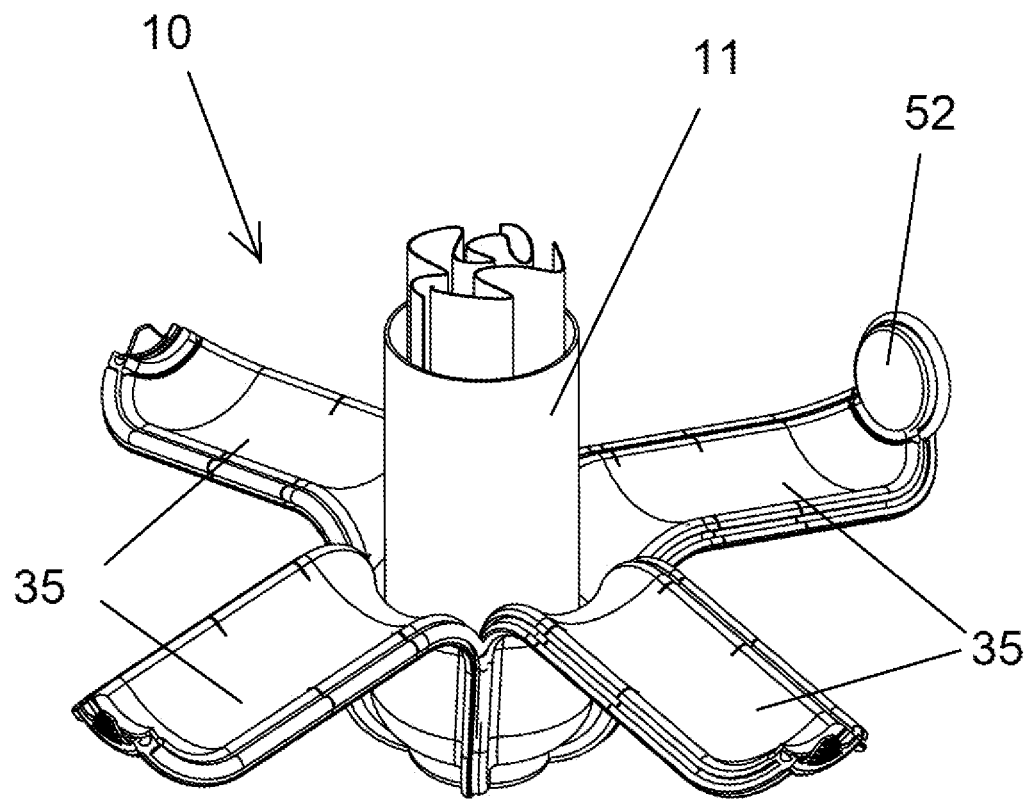
FIG. 16 is an upper perspective view of the container of FIG. 1 opened and holding a wrap.
Figure 17:
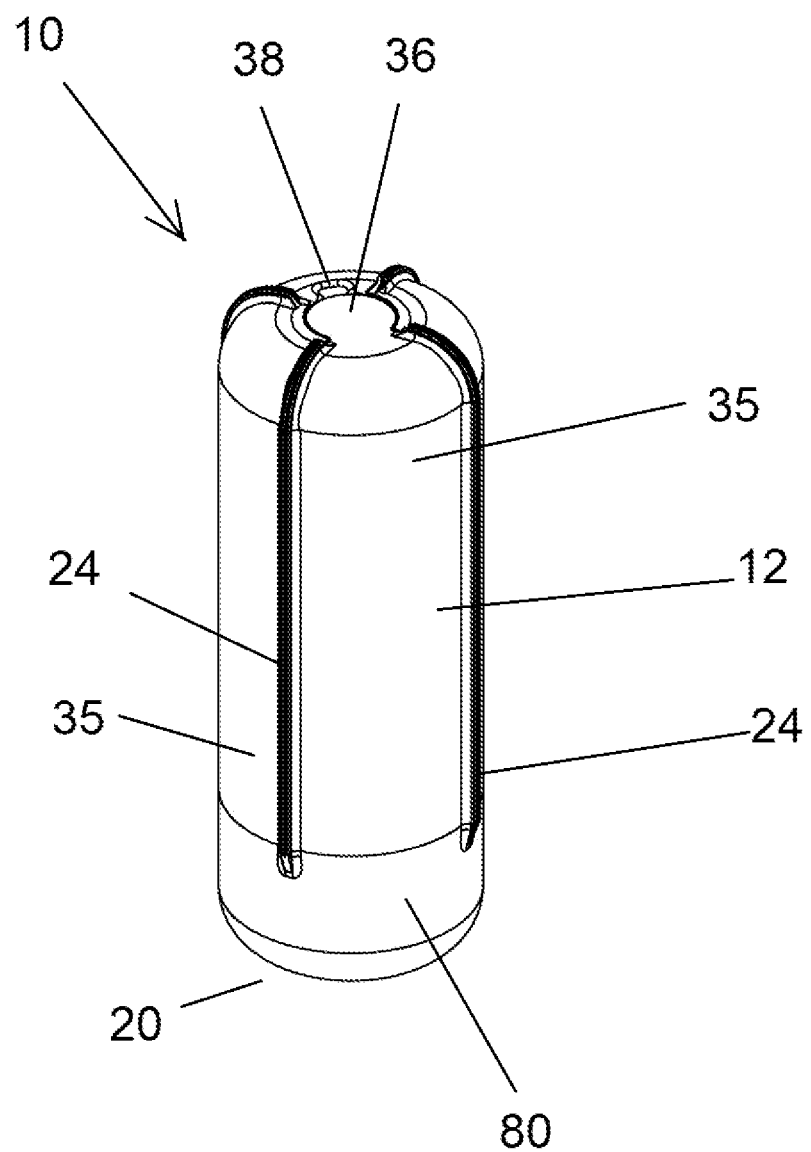
FIG. 17 is an upper perspective view of a second embodiment of a container in accordance with the present invention.
Figure 18:
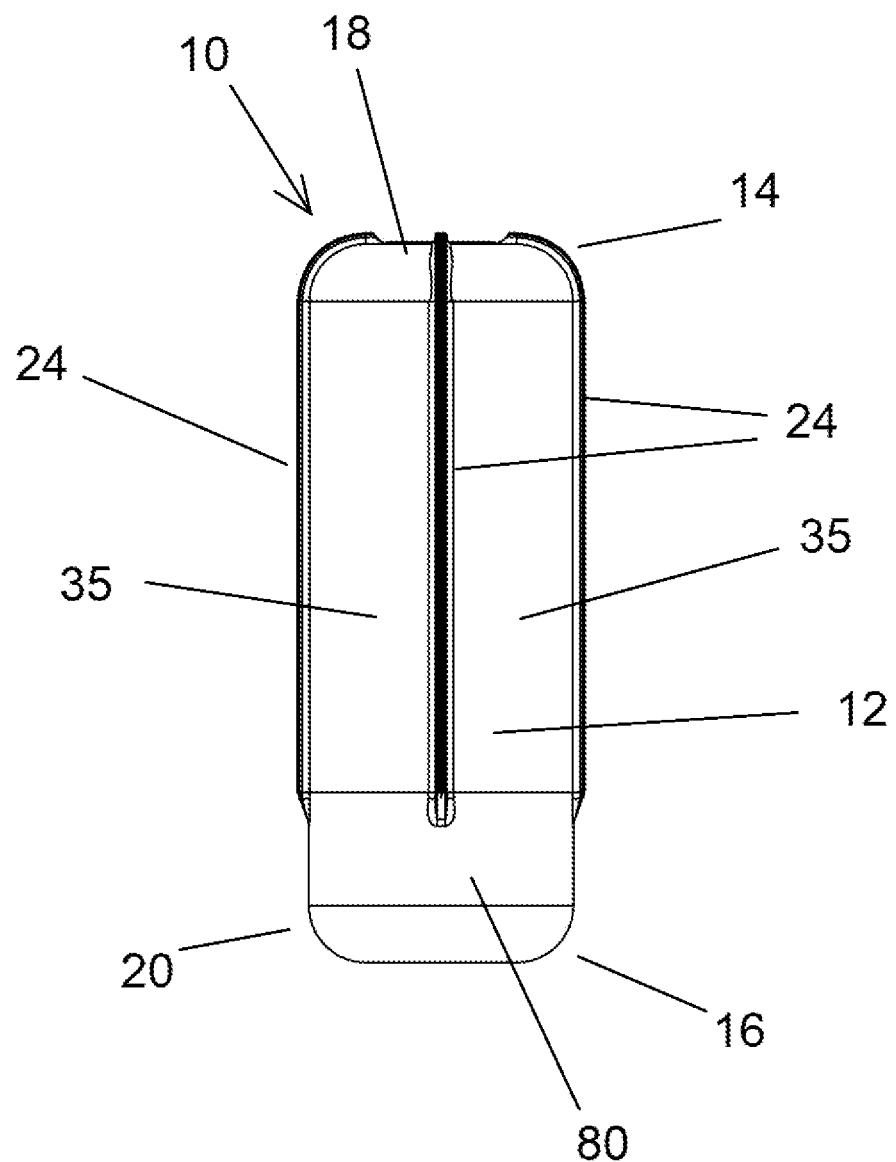
FIG. 18 is a first side view of the container of FIG. 17.
Figure 19:
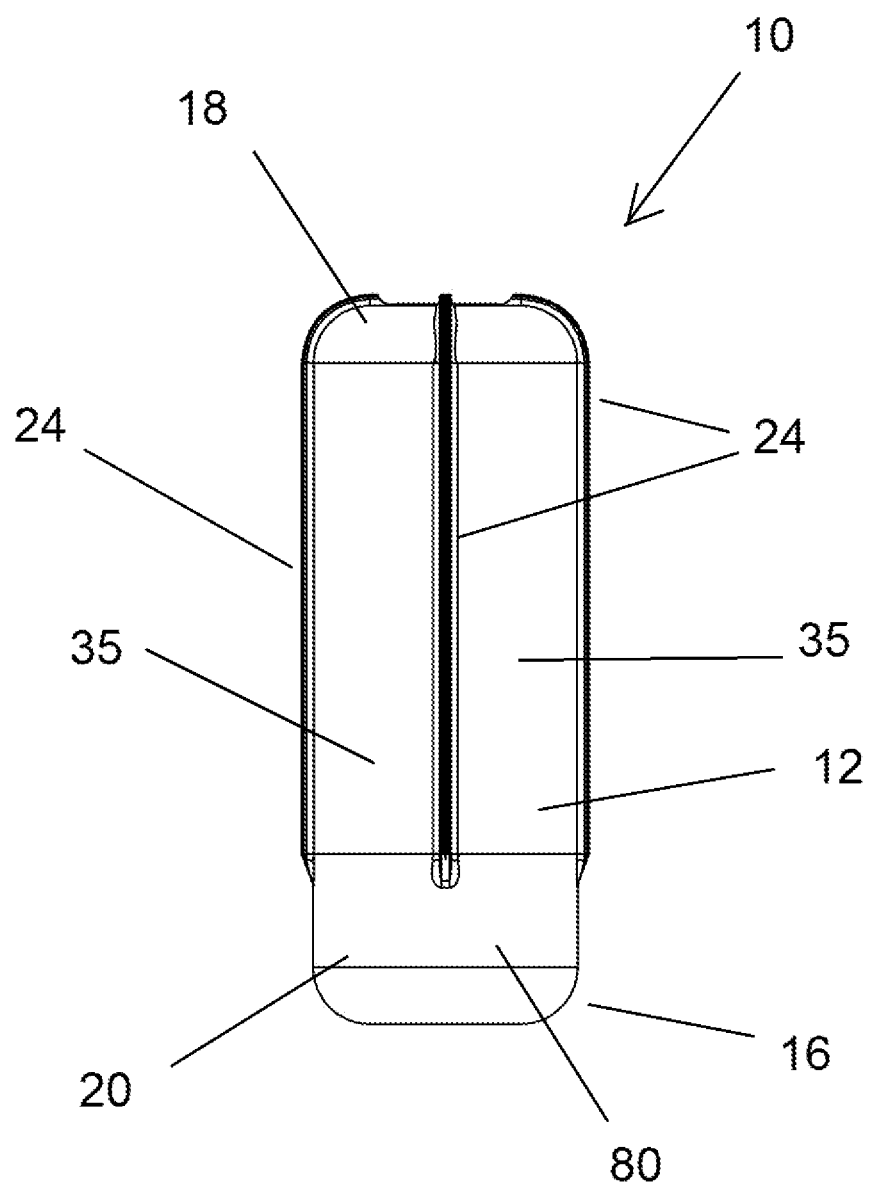
FIG. 19 is a second view of the container of FIG. 17.
Figure 20:
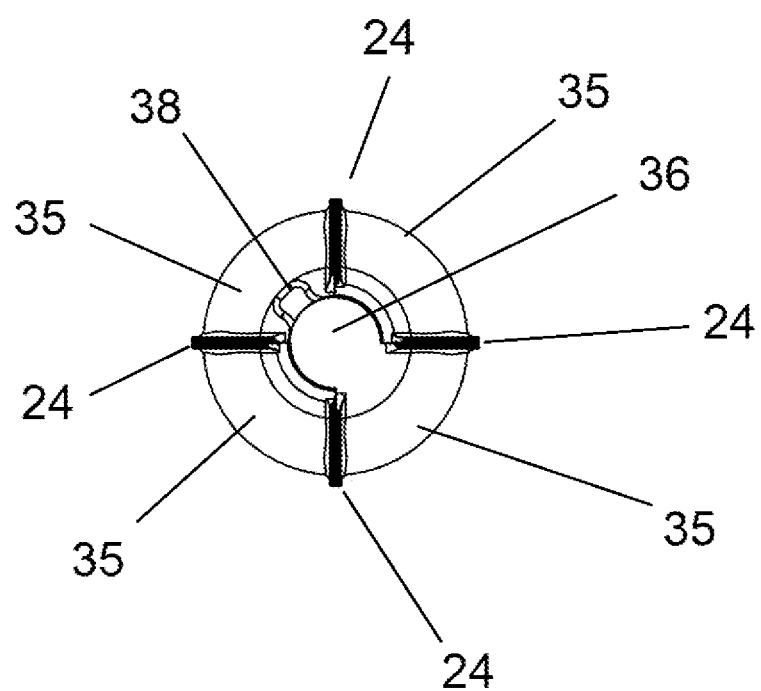
FIG. 20 is a top view of the container of FIG. 17.
Figure 21:
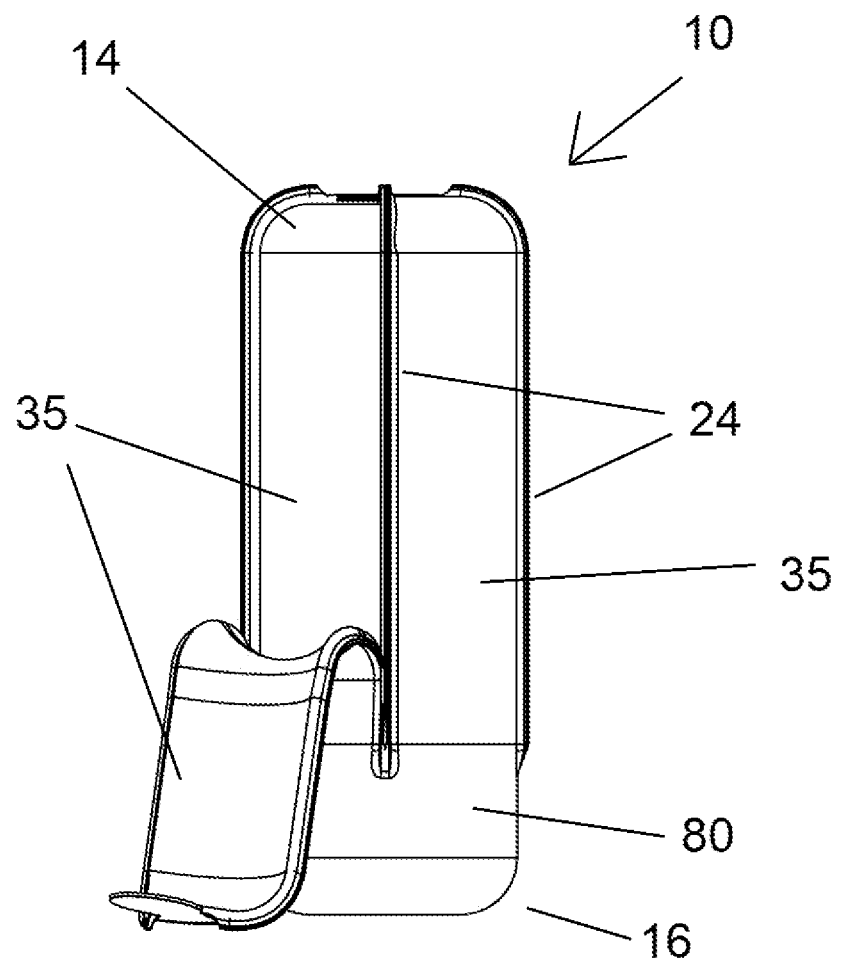
FIG. 21 is a side view of the container of FIG. 17 with one of the wall members separated outwardly.
Figure 22:
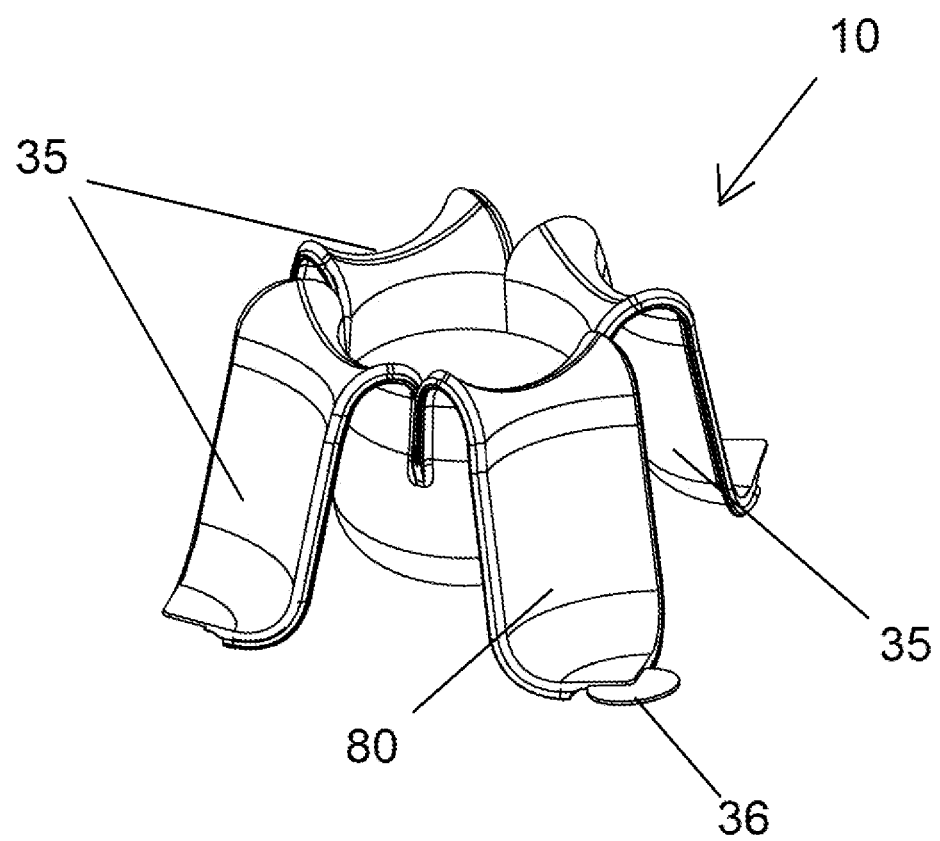
FIG. 22 is an upper perspective view of the container of FIG. 17 with all of the wall members separated.
Figure 23A:
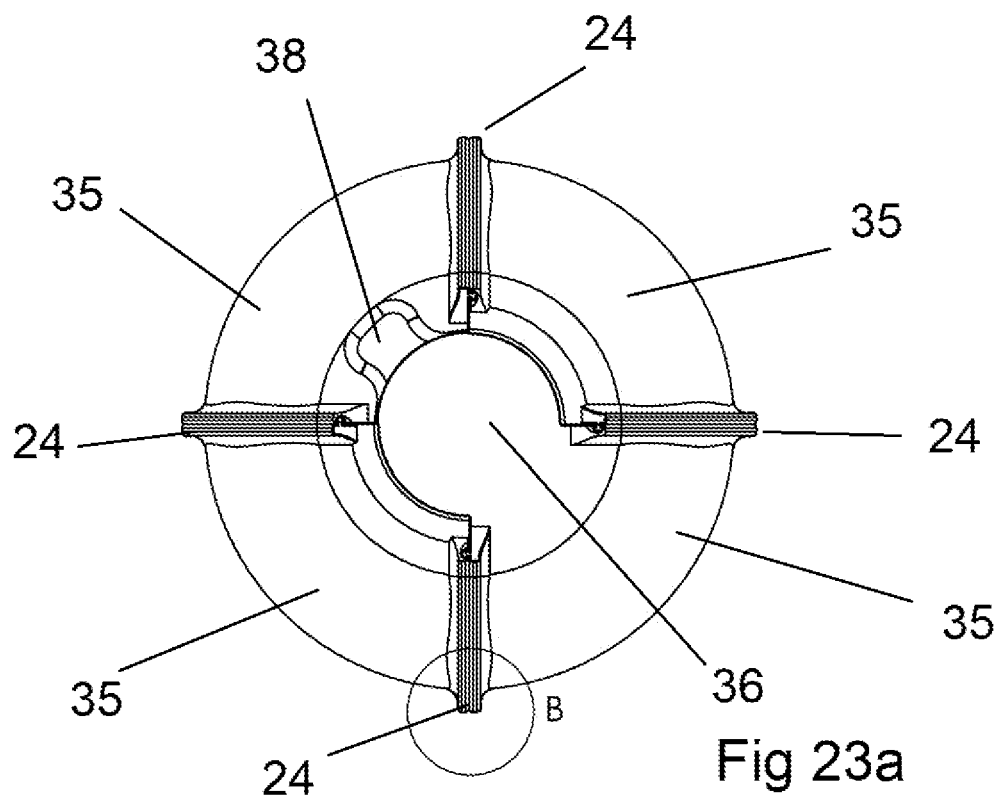
FIG. 23a is a top view of the container of FIG. 17.
Figure 23B:
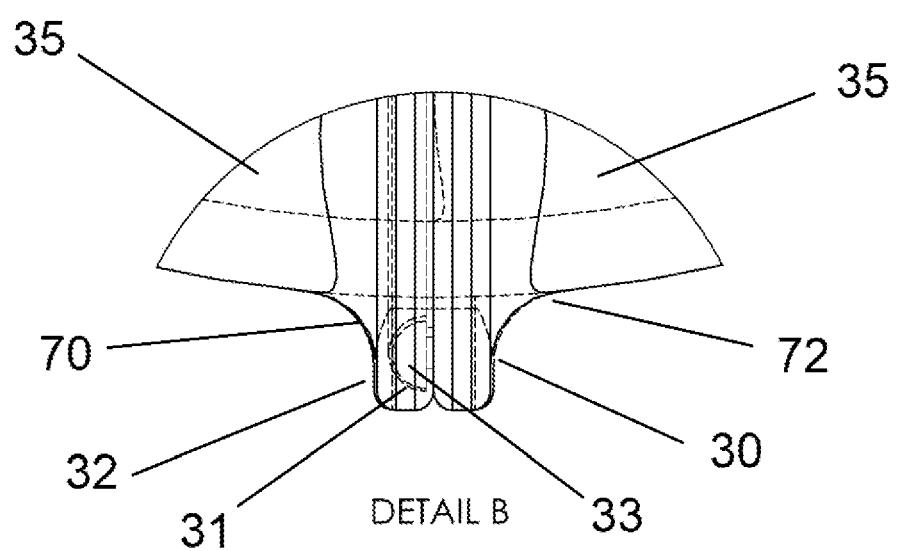
Figure 24A:
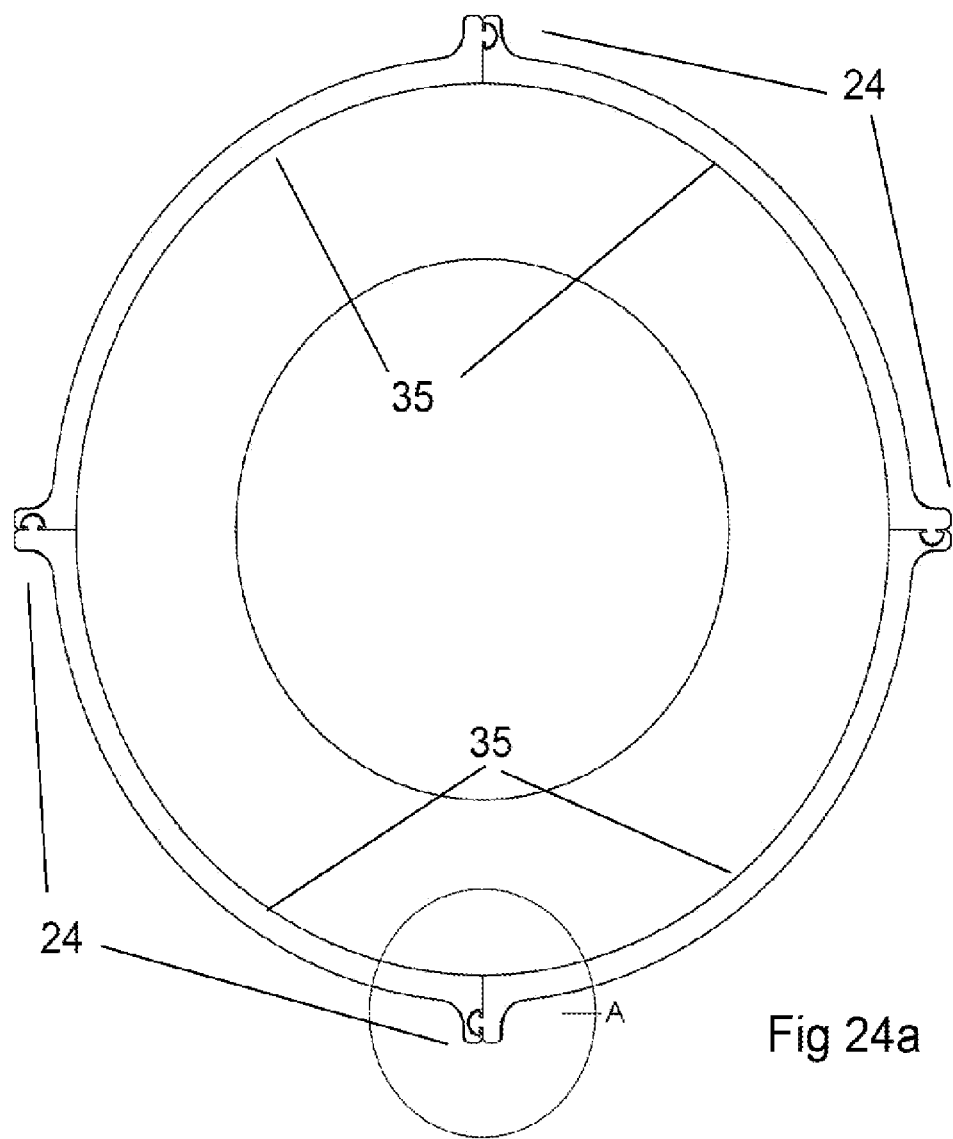
FIG. 24a is a top cross sectional view of the container of FIG. 17.
Figure 24B:
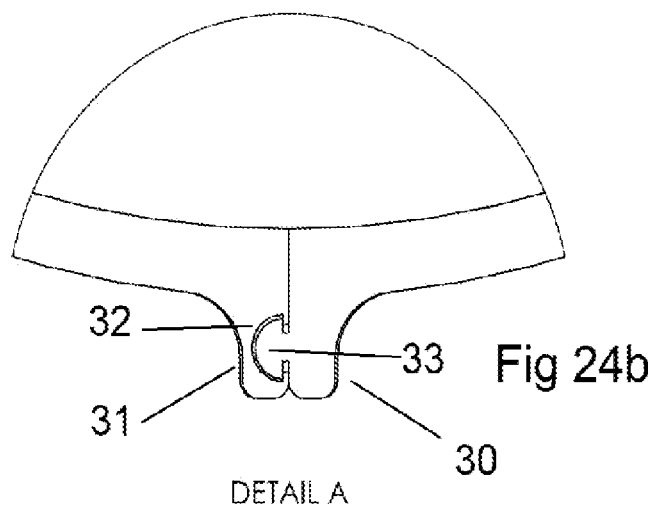

The press seal mechanism comprises a rib 33 provided on an inner surface of the first lip portion 30 and a channel 31 provided on an inner surface of the second lip portion 32. As can be seen in FIG. 12, the channel 31 includes a narrowed neck portion 74 and the rib 33 includes a complementary widened outer end 76. The widened outer end 76 of the rib 33 is dome shaped such that the rib 33 and the channel 31 are generally mushroom shaped. The material of the rib 33 and the material around the channel 31 are flexible such that the rib 33 may be received within the channel 31 by applying pressure to push the rib 33 inwardly toward the channel by pushing on outer sides of the first and second lip portions 30 and 32.

The upper and lower ends of the wall members 35 each include a rim segment 56. The rim segments 56 extend outwardly from the outer surface of the wall member 35 around the arcuate recesses 66. That is, the rim segments 56 extend between the ends of the lip portions 30 and 32. The rim segments 56 meet when the wall members 35 are connected together to form an annular rim 58 around each of the upper and lower openings 28 and 29.

Inner surfaces of each of the annular rims 58 of the container 10 are provided with a groove 60 therein. The grooves 60 also include an outer narrowed neck 74 in a similar manner to the channels 31.

An upper cap 52 is provided to seal across the upper opening 28 in the first end portion 18 and a lower cap 54 is provided to seal across the lower opening 29 in the second end portion 20. The upper and lower caps 52 and 54 each comprise a circular disc having a peripheral ridge 62 which is received within the corresponding groove 60. The peripheral ridge 62 of each of the upper and lower caps 52 and 54 includes also a widened outer end portion 76 provided such that the peripheral ridge 62 may be engaged into the groove 60 in order to secure the upper and lower caps 52 and 54 across the upper and lower openings 28 and 29. The cross sectional shape of the peripheral ridge 62 and the groove 60 are also both generally mushroom shaped. The upper and lower caps 52 and 54 are formed from a relatively rigid plastic material such that the peripheral ridges 62 can be received into the corresponding grooves 60 by press fit.

The annular rim 58 adjacent the first end 14 of the container 10 is provided with one or more tabs 64. The tabs 64 extend inwardly across the upper opening 28 such that the tabs 64 may be gripped to pull the wall member 35 outwardly and separate the wall member 35 from the upper cap 52 and the adjacent wall members 35.

In use, each of the seams 24 may be separated (as shown in FIGS. 13 to 16) and a food item, such as a wrap 11, inserted into the second end of the interior of the container 10. The container 10 may then be sealed by applying sliding pressure to each of the seams 24 by pressing on outer surfaces of the lip portions 30 and 32. The wrap 11 is then held securely within the cylindrical interior of the container 10. When the wrap 11 is to be consumed, the tabs 64 may be gripped and pulled outwardly to separate the adjacent wall members 35. The wall members 35 may be flexed outwardly adjacent the first end 14 of the container 10 with the second end 16 remaining connected. The wrap 11 may be consumed from the container 10 with the wall members 35 being progressively separated as required. The wall members 35 may also be completely separated for washing of the container 10.

FIGS. 17 to 24 show a second embodiment of a container 10 in accordance with the present invention. The container 10 of FIGS. 17 to 24 is similar to the embodiment of FIGS. 1 to 16 and like reference numbers are used to denote like parts.

In the embodiment of FIGS. 17 to 24, the seams 24 extend from the first end 14 of the outer shell 12 towards the second end 16 but stop short of the second end 16. The wall members 35 are therefore connected together at second ends thereof by a shell end portion 80. The shell end portion 80 comprises a continuous cup with each of the wall members 35 extending outwardly from a rim portion of the cup.

One of the wall members 35 is provided with a cover 36 adjacent the first end thereof. The cover 36 comprises a planar portion shaped to seal across the upper opening 28 in the first end 14 of the outer shell 12. A recess 38 is provided in the wall member 35 opposite the wall member 35 having the cover 36. The recess 38 is provided to allow the distal end of the cover 36 to be gripped and flexed outwardly away from the opening 28. Pulling the cover 36 outwardly allows the process of separating the wall members 35 to be started.

It will be readily apparent to persons skilled in the relevant arts that various modifications and improvements may be made to the foregoing embodiments, in addition to those already described, without departing from the basic inventive concepts of the present invention.

The invention claimed is:

1. A container comprising:
an outer shell having a first end and an opposed second end, the outer shell formed from a plurality of elongate wall members each having first and second longitudinal sides extending from the first end towards the second end; and
lip portions extending transversely outwardly from along the first and second longitudinal sides of each of the wall members such that inner surfaces of the lip portions on the first and second longitudinal sides of each wall member are locatable adjacent inner surfaces of the lip portions on the second and first longitudinal sides respectively of adjacent wall members;
wherein the inner surfaces of the lip portions include a press seal mechanism comprising a rib provided on an inner surface of the first lip portion and a channel provided on an inner surface of the second lip portion, the channel including a narrowed neck portion and the rib including a complementary widened outer end such that pressing inwardly on outer surfaces of adjacent lip portions engages the press seal mechanism to form a plurality of seams securing adjacent wall members together.

2. The container in accordance with claim 1, wherein the widened outer end of the rib is dome shaped such that the rib and the channel are mushroom shaped.

3. The container in accordance with claim 1, wherein the outer shell comprises a domed first end portion, a domed second end portion and a cylindrical side portion.

4. The container in accordance with claim 3, wherein each of the wall members comprises an elongate wall having an arcuate transverse cross section and inwardly tapering opposed ends such that the connected wall members form the tubular outer shell having domed end portions.

5. The container in accordance with claim 1, wherein the wall members are formed from a flexible material.

6. The container in accordance with claim 5, wherein the wall members are formed from a silicone-based material.

7. The container in accordance with claim 1, wherein the wall members are each of the same size such that the seams are located at equal angular spacings around the periphery of the outer shell.

8. The container in accordance with claim 7, wherein the seams extend from the first end portion to the second end portion of the outer shell such that the wall members may be completely separated.

9. A container comprising:
an outer shell having a first end and an opposed second end, the outer shell formed from a plurality of elongate wall members each having first and second longitudinal sides extending from the first end towards the second end; and
lip portions extending transversely outwardly from along the first and second longitudinal sides of each of the wall members such that inner surfaces of the lip portions on the first and second longitudinal sides of each wall member are locatable adjacent inner surfaces of the lip portions on the second and first longitudinal sides respectively of adjacent wall members;
wherein the inner surfaces of the lip portions include a press seal mechanism such that pressing inwardly on outer surfaces of adjacent lip portions engages the press seal mechanism to form a plurality of seams securing adjacent wall members together,
wherein the wall members are each of the same size such that the seams are located at equal angular spacings around the periphery of the outer shell,
wherein the seams extend from the first end portion to the second end portion of the outer shell such that the wall members may be completely separated, and
wherein upper and lower ends of the wall members include arcuate recesses such that, when the wall members are connected together, circular upper and lower openings are defined.

10. The container in accordance with claim 9, wherein upper and lower caps are provided to engage across the upper and lower openings respectively.

11. The container in accordance with claim 10, wherein the upper and lower ends of the wall members each include a rim segment extending outwardly from the outer surface of the wall member around the arcuate recesses such that rim segments meet when the wall members connected together to form an annular rim around each of the upper and lower openings.

12. The container in accordance with claim 11, wherein inner surfaces of each of the annular rims of the container are provided with a groove therein to receive a peripheral ridge provided around the upper and lower caps.

13. The container in accordance with claim 12, wherein the grooves include an outer narrowed neck and the peripheral ridge includes a complementary shaped widened outer end such that the peripheral ridges can be received into the corresponding grooves by press fit.

14. The container in accordance with claim 9, wherein the annular rim adjacent the first end of the container is provided with one or more tabs extending inwardly across the upper opening such that the tabs may be gripped to pull the wall members outwardly and separate the wall member from the upper cap and adjacent wall members.

15. The container in accordance with claim 1, wherein the wall members are connected together at second ends thereof by a shell end portion comprising a continuous cup with each of the wall members extending outwardly from a rim portion of the cup such that the seams extend from the first end portion to a location offset from the second end portion.

16. A container comprising:
   an outer shell having a first end and an opposed second end, the outer shell formed from a plurality of elongate wall members each having first and second longitudinal sides extending from the first end towards the second end; and
   lip portions extending transversely outwardly from along the first and second longitudinal sides of each of the wall members such that inner surfaces of the lip portions on the first and second longitudinal sides of each wall member are locatable adjacent inner surfaces of the lip portions on the second and first longitudinal sides respectively of adjacent wall members;
   wherein the inner surfaces of the lip portions include a press seal mechanism such that pressing inwardly on outer surfaces of adjacent lip portions engages the press seal mechanism to form a plurality of seams securing adjacent wall members together,
   wherein the wall members are connected together at second ends thereof by a shell end portion comprising a continuous cup with each of the wall members extending outwardly from a rim portion of the cup such that the seams extend from the first end portion to a location offset from the second end portion, and
   wherein one of the wall members is provided with a cover comprising a planar portion shaped to seal across the upper opening in the first end of the outer shell.

17. The container in accordance with claim 16, wherein a recess is provided in the wall member opposite the wall member having the cover to allow the distal end of the cover to be gripped and flexed outwardly away from the opening.

18. The container in accordance with claim 8,
   wherein upper and lower ends of the wall members include arcuate recesses such that, when the wall members are connected together, circular upper and lower openings are defined.

19. The container in accordance with claim 15,
   wherein one of the wall members is provided with a cover comprising a planar portion shaped to seal across the upper opening in the first end of the outer shell.

* * * * *